US012158158B2

(12) United States Patent
Schiffmann et al.

(10) Patent No.: US 12,158,158 B2
(45) Date of Patent: Dec. 3, 2024

(54) HIGH ROTATIONAL SPEED ROTOR AND TURBOCOMPRESSOR COMPRISING THE SAME

(71) Applicant: CLIMAT GESTION SA, St-Pierre-de-Clages (CH)

(72) Inventors: Jürg Schiffmann, Bern (CH); Luis Eric Olmedo, Neuchâtel (CH)

(73) Assignee: CLIMAT GESTION SA, St-Pierre-de-Clages (CH)

( * ) Notice: Subject to any disclaimer, the term of this patent is extended or adjusted under 35 U.S.C. 154(b) by 0 days.

(21) Appl. No.: 18/554,573

(22) PCT Filed: Apr. 19, 2021

(86) PCT No.: PCT/IB2021/053199
§ 371 (c)(1),
(2) Date: Oct. 9, 2023

(87) PCT Pub. No.: WO2022/224009
PCT Pub. Date: Oct. 27, 2022

(65) Prior Publication Data

US 2024/0191722 A1 Jun. 13, 2024

(51) Int. Cl.
*F04D 29/053* (2006.01)
*F01D 5/02* (2006.01)
*F04D 29/26* (2006.01)

(52) U.S. Cl.
CPC ............. *F04D 29/053* (2013.01); *F01D 5/02* (2013.01); *F04D 29/26* (2013.01); *F05D 2220/30* (2013.01); *F05D 2240/24* (2013.01)

(58) Field of Classification Search
CPC ............................ F04D 29/284; F04D 29/053
See application file for complete search history.

(56) References Cited

U.S. PATENT DOCUMENTS

2006/0177316 A1 8/2006 Shi
2017/0009780 A1 1/2017 Yano et al.
2020/0166039 A1 5/2020 Mori et al.

FOREIGN PATENT DOCUMENTS

GB 962277 A 7/1964
WO 2019008294 A1 1/2019

OTHER PUBLICATIONS

International Search Report for PCT/IB2021/053199, mailed Dec. 22, 2021, 4 pages.
Written Opinion of the ISA for PCT/IB2021/053199, mailed Dec. 22, 2021, 6 pages.

*Primary Examiner* — Courtney D Heinle
*Assistant Examiner* — John S Hunter, Jr.
(74) *Attorney, Agent, or Firm* — NIXON & VANDERHYE

(57) ABSTRACT

A turbocompressor includes at least one rotor the axis of which includes at least one preloading element permanently maintaining the diameter of the axis larger than its natural diameter, a high speed rotor and a method of manufacturing the same.

17 Claims, 3 Drawing Sheets

HIGH ROTATIONAL SPEED ROTOR AND TURBOCOMPRESSOR COMPRISING THE SAME

Figure 1:
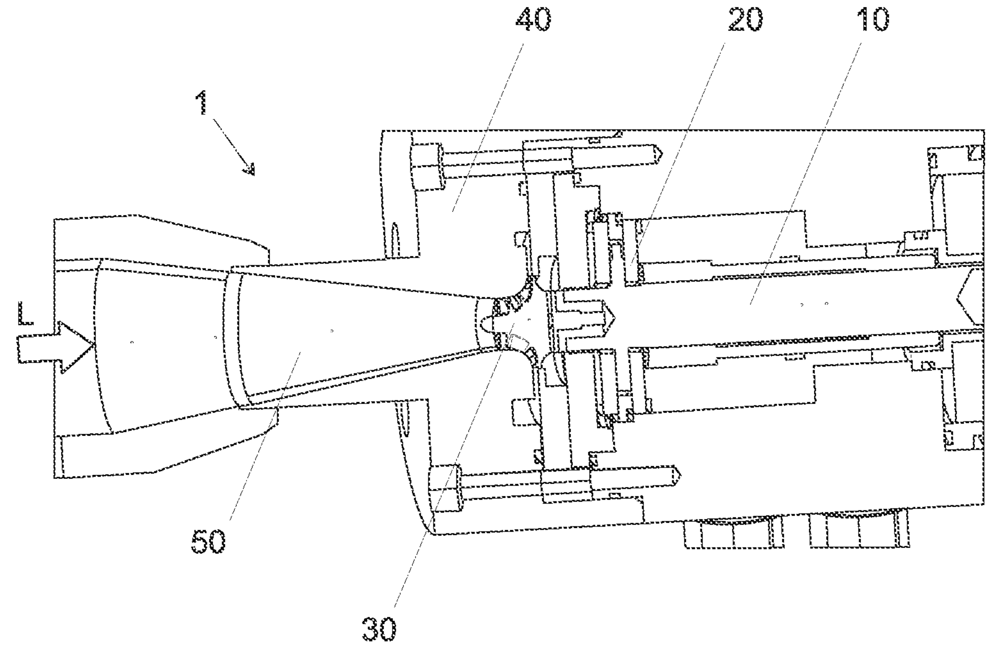

This application is the U.S. national phase of International Application No. PCT/IB2021/053199 filed Apr. 19, 2021, which designated the U.S. the entire contents of which is hereby incorporated by reference.

TECHNICAL DOMAIN

The present invention concerns a high rotational speed rotor, in particular suitable for refrigeration equipment, such as chillers or heat pumps used in industrial processes, for turbines in organic Rankine cycles, for fuel cell recirculation devices, optical scanners, inertial gyroscopes and any other application where high rotational speed rotors are necessary. The present rotor is used in radial turbocompressors lubricated by a gaseous working fluid.

RELATED ART

Chillers are used in many industrial and agricultural processes in cooling and freezing operations. Such compressors are also usable as heat pumps. The ammonia chillers are currently driven by large, oil-lubricated piston compressors, which are bulky, heavy, and which require regular maintenance. The oil used for the lubrication may in addition contaminate the ammonia, it furthermore represents a polluting material to be replaced and treated before being discarded. In terms of efficiency, the necessity of recycling and cooling down the lubricant consumes additional power which is detrimental to the current trend of low energy consumption. In addition, the oil migrating within the cycle depreciates the heat transfer in the heat exchangers.

Some turbocompressors have been disclosed wherein the lubricant is the gaseous refrigerant itself, thus avoiding the use of oil as lubricant. The rotor of the turbocompressor is there supported by the gaseous refrigerant. An important aspect related to such arrangement is that the compressor can be miniaturized. However, the centrifugal effect provokes an outward deformation of the rotating shaft, which decreases the nominal bearing clearance and may limit the ability of the bearings to support the shaft. This deformation is critical for gas lubricated bearings. In some applications the shaft-bearing clearance is of similar magnitude as the centrifugal deformation of the shaft, which may lead to a seizure.

In addition, a dynamic compressor, as opposed to positive displacement machines, is more complex in its control since the rotor speed affects both mass flow and the achievable pressure ratio, limited by surge and choke. A turbocompressor going into surge is to be avoided, since there is a high risk of damaging the machine and the refrigeration cycle can barely be stabilized once it goes into surge. Often the only way is to stop the machine and restart it. Hence, the turbocompressor driven chiller needs an enhanced control in order to avoid risky regimes.

There is thus room for improvements in this technical field, in particular to provide more compact and more cost-effective compressors. A key element is to allow a higher rotational speed of the rotor despite the physical limitations above-described. There is also a need for a better control of the refrigeration cycles.

SHORT DISCLOSURE OF THE INVENTION

It is thus an object of the present invention to provide a compact turbocompressor, which is free or substantially free of lubricating oil, being thus more environmentally friendly, while improving the cycle efficiency.

It is a further object of the present invention to provide a turbocompressor having an improved efficiency compared to the known turbocompressors. This includes less power consumption and/or more compression power.

It is a further object of the present invention to provide a rotor adapted for high rotational speed, having a minimal diameter increase under rotation. It is a further object to provide a rotor having a minimal diameter variation from its rest position to its functional rotation and reversely.

It is a further object of the present invention to provide a compact turbocompressor, oil-free operation, which facilitates the operation of multistage cycles and reduces heat exchanger losses.

Another aim of the invention is to provide an improved method for compressing a gaseous working fluid, and in particular a refrigerating gaseous fluid using a radial turbocompressor.

According to the invention, these aims are attained by the object of the independents claims, and further detailed through the claims dependent thereon.

With respect to what is known in the art, the invention provides improved turbocompressors, environmental friendly, having an improved efficiency.

SHORT DESCRIPTION OF THE DRAWINGS

Figure 2:
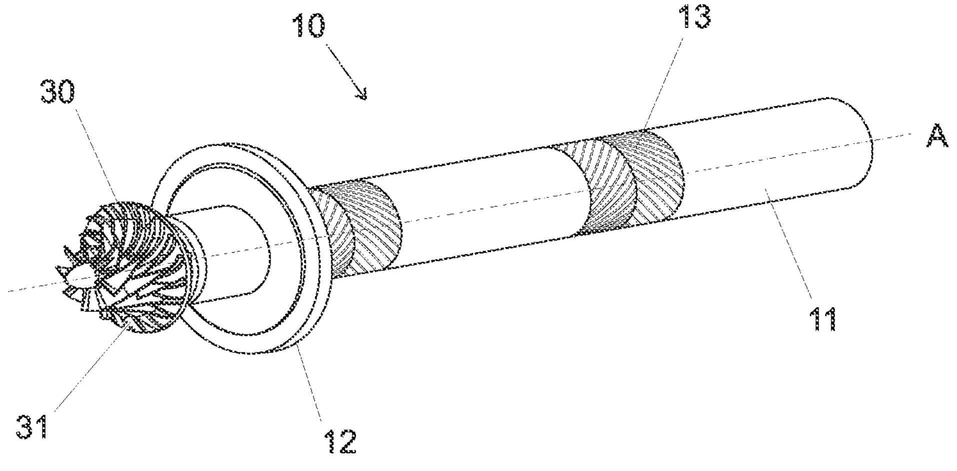

Exemplar embodiments of the invention are disclosed in the description and illustrated by the following drawings:

FIG. 1: schematic cross sectional view of the turbocompressor according to the present disclosure;

FIG. 2: detailed view of a rotor according to an embodiment of the present invention.

Figure 3A:
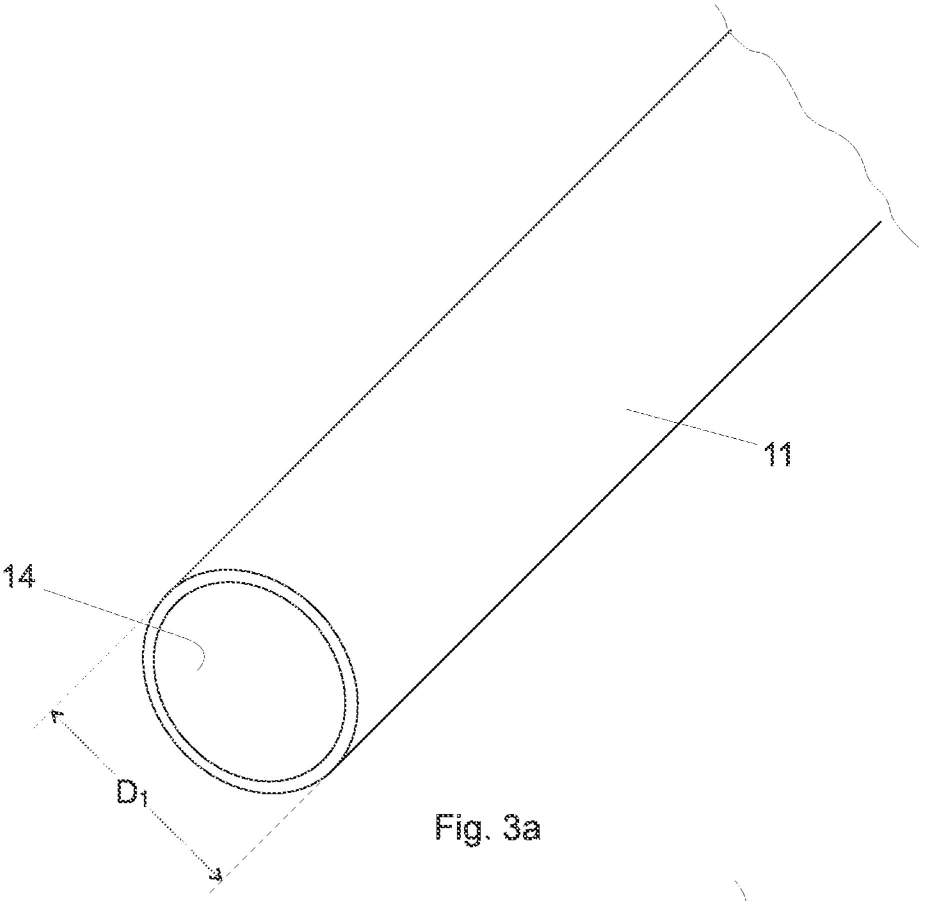

FIG. 3*a*: schematical view of a rotor without load

Figure 3B:
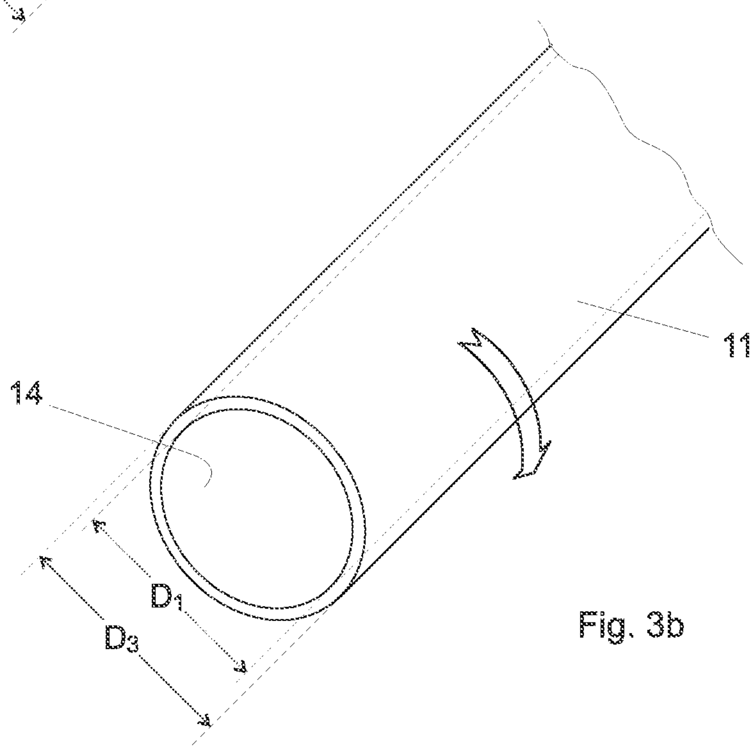
Figure 3C:
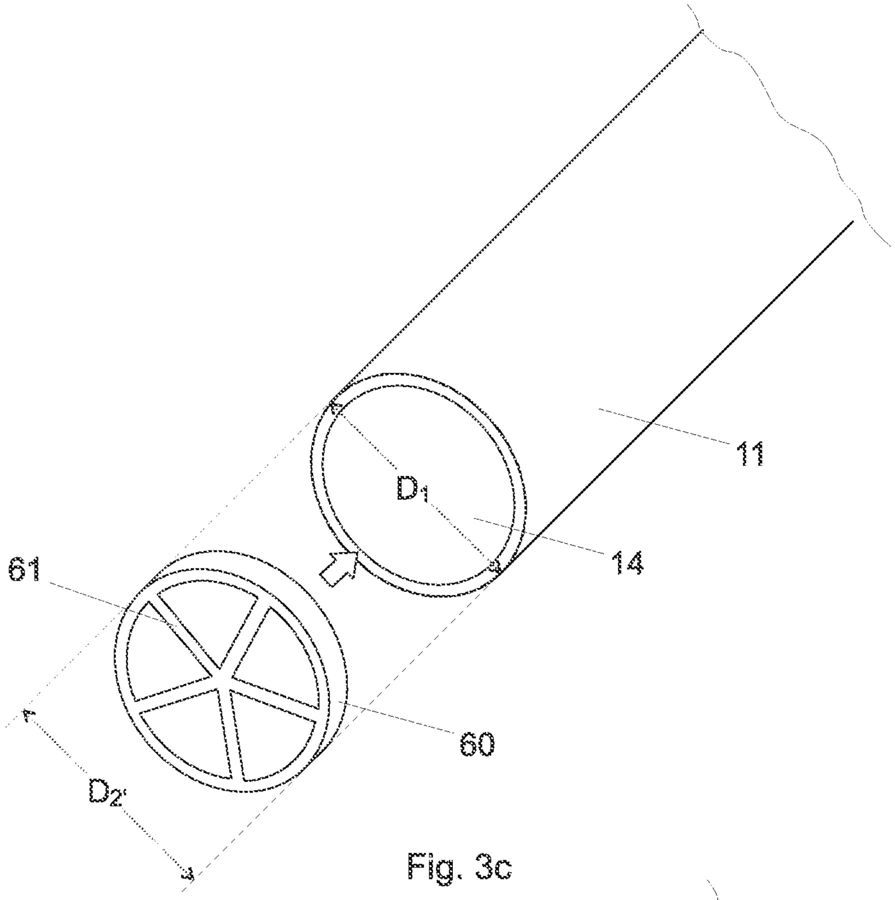
Figure 3D:
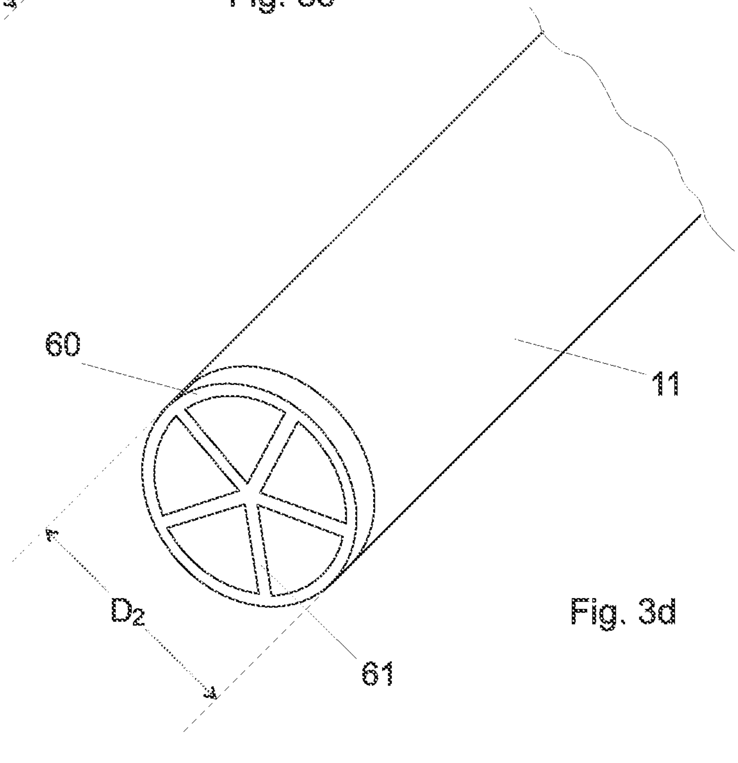

FIG. 3*b*: schematical view of the rotor under loading constraint;

FIG. 3*c*: schematical view of the rotor and an example of one preloading element according to an embodiment of the present invention;

FIG. 3*d*: schematical view of the rotor combined with an example of one preloading element according to an embodiment of the present invention.

EXAMPLES OF EMBODIMENTS OF THE PRESENT INVENTION

The turbocompressor 1 described herein is particularly adapted for gaseous working fluid such as ammonia or other fluids with low molecular weights such as water or propane as an example. The rotation speed of the rotor needs to be significantly elevated, typically higher than 100 000 revolutions per minute or 170 000 revolutions per minute or even 300 000 revolutions per minute for a rotor having a diameter comprised between around 20 mm and 60 mm, or higher, depending of the rotor power and its diameter. At such a high rotation speed, the aerodynamic compressor design and the thermal management remain challenging parameters. The radial deformation of the rotor is also a high limitative constraint in view of the thin clearance.

Although the speed of rotation of the rotor may be defined by a number of rounds per minutes, thus indicating its angular speed, the rotation speed is better defined by its DN number, related to its tangential speed. The tangential speed considers both the angular speed and the external diameter of the rotor and can be expressed according to the following formula:

$$\text{DN equal or proportional to Angular speed} \times \text{rotor radius}$$

In the present description, the terms "high speed" or "high rotational speed" thus denote DN numbers of more than around 3 millions, even more than 4 millions, expressed with its typical units of rpm*mm. Considering the angular speed value, the terms "high speed" or "high rotational speed" better designate an angular speed higher than 100 000 rounds per minute, preferably higher than 140 000 rounds per minute, more preferably around 300 000 rounds per minute or higher, when applied to a rotor having a diameter higher than around 20 mm, or higher than around 50 mm. The skilled practitioner understands that large diameters are also concerned, even under lower angular speed, provided that the tangential speed remains under the scope of the above-mentioned values. The high rotational speed thus clearly denotes rotation speed under which the rotor receives forces resulting in a significant increase of its diameter. In the framework of the present description an increase of the rotor diameter of 0.01% or more, may already be considered significant in view of the clearance around the rotor. The high rotational speed also relates to speeds under which the rotor is functional, meaning that it can compress the gaseous fluids.

With reference to FIG. 1, the turbocompressor 1 according to the present disclosure comprises a housing 40 in which the rotor 10 is arranged so as to be mobile in rotation. One or more bearings 20 are provided inside the housing 40, to maintain the rotor 10 in position. In particular, the one or more bearing 20 surrounds the axis 11 of the rotor 10, while preserving a clearance with regard to the external surface of the axis 11. The bearing 20 is preferably adapted for the gaseous fluid L. The rotor 10 can thus rotate around its longitudinal axis A without contact with the bearings. The rotor 10 is driven in rotation by means of a motor (not represented). The motor may be any electrical motor adapted for high speed rotation, such as rotational speed higher than 100 000 rounds per minutes, or higher than 150 000 or 170 000 rounds per minutes, or even higher than 300 000 rounds per minutes.

Concerning the motor design, the winding is chosen to avoid an unbalanced attraction forces on the rotor, which can lead to possible mechanical instabilities. Furthermore, the high speeds imply high iron losses due to flux frequencies of about 2800 Hz. The selected motor may show the best compromise between iron and copper losses.

A end of the rotor 10 comprises a compressor impeller 30 which deflects the gaseous working fluid L in a radial direction. The compressor is thus a radial compressor for this reason. The deflected gaseous working fluid L is guided along the axis 11 of the rotor 10. The resulting layer of gaseous working fluid L around the axis 11 allows the rotor 10 to float and remains centred on its longitudinal axis A within the bearings during its rotation.

Referring to FIG. 2, more details of the rotor 10 are visible. For example, the external surface of the axis 11 may comprise one or more surface areas 13 having a specific treatment. For example, such a surface area 13 may be provided with grooves, such a V-shape grooves helping to create a gas film around the axis 11 under rotation. Such surface areas 13 may be alternatively or in addition provided with a coating or a protective layer. Outside these surface areas, the external surface of the axis 11 may be free of motives and coating.

The rotor 10 may comprise one or more protrusions 12 allowing for example to stabilise it within the housing 40. It further comprises at one of its ends a compressor impeller 30 having compressing blades 31 or equivalent shape allowing to deflect the gaseous working fluid L. The housing 40 is provided with an inlet 50 collecting the gaseous working fluid L. The inlet 50 is arranged close to the compressor impeller 30. The inlet 50 may in addition have a conical shape so as to concentrate the flow of the gaseous working fluid L toward the compressor impeller 30.

It is here specified that the rotor 10 should be very well equilibrated so that a perfect rotation movement around the longitudinal axis A can be obtained, including at very high rotation speed, as above-mentioned. The rotor 10 has in addition preferably a light weight to avoid inertia. At such high rotational speed, the weight may be a negative factor that increases the potential defects, and can result in speed limitation, in vibrations and rotodynamic instabilities.

In one embodiment, the material of the rotor 10 or at least of the axis 11 is selected to be light as well as resistant.

In one embodiment, the material of the rotor 10 or at least of its axis 11 is selected so as to show a minimal deformation under load. In particular, the material is selected so as to show a minimal increase of its diameter under centrifugal forces at high rotational speed. In particular, the increase of its diameter is not higher than 0.1% of its natural diameter or not higher than around 20 to 30 micrometres.

In one embodiment, the rotor 10 or at least its axis 11 has a Young's modulus of higher than 400 GPa, preferably between 500 and 800 GPa. It may have a Vickers number of higher than 2000, preferably higher or equal to around 2600. Preferably, the material of the rotor 10, or at least of its axis 11 is selected such that the specific modulus is comprised between 0.01 to 0.5 GPa/kg/m$^3$ and the specific strength is comprised between 0.01 to 0.9 MPa/kg/m$^3$, wherein the specific modulus denotes the ratio between the Young's modulus and the material density and wherein the specific strength denotes the ratio between yield strength and the material density.

Thus, any material having the suitable density and the suitable Young's modulus to correspond to the above-mentioned values may be used including steel or metal alloys, or ceramic materials such as carbide materials.

The axis 11 of the rotor may be hollow or at least partly hollow so as to define an internal space 14 (FIG. 3*a*, 3*b*). Preferably, the internal space extends through the full length of the axis 11. The axis 11 of the rotor has a natural diameter D1, corresponding to its external diameter in absence of any external constraint. The natural diameter D1 corresponds in particular to the external diameter of the axis 11 in absence of rotation, at a temperature of about 20° C. The natural diameter D1 may be for example of 30 mm. The diameter of the axis 11 may however vary according to the needs, as it will be evaluated by one skilled in the art. The natural diameter D1 may typically be comprised between 20 mm and 100 mm.

Depending on the applied constraint, the external diameter of the axis 11 may increase and correspond to a loaded diameter D3, higher than the natural diameter D1 of the axis 11. The loaded diameter D3 may result from the centrifugal force under high rotational speed. Alternatively, the loaded diameter D3 may result from an increase of temperature. The loaded diameter D3 may also result from a combination of parameters, such as a high rotational speed and an increase of temperature. Depending on the intensity and the nature of the load, or the stress, applied to the axis 11, the increase of diameter from its natural diameter D1 may be of around 0.01% to 0.2%, typically around 0.05% to 0.1%. This results in a significant variation of the diameter when the rotor is at rest compared to its working operation. Such a variation may be larger than the clearance between the axis 11 and the surrounding static part such as the bearings 20.

Typically, the clearance between the external surface of the axis 11 and the closest surrounding parts such as the bearings 20 is lower than 30 micrometres, or lower than around 20 micrometres, or even lower than around 10 micrometres, depending on the global dimensions of the turbocompressor. When the natural diameter D1 allows such a clearance, the increase of diameter under stress would compensate the clearance and even go further, preventing the rotor 10 to rotate due to its direct contact with the surrounding elements. Alternatively, when the natural diameter D1 is small enough to anticipate such increase under stress, the initial clearance is too large, rendering the support of the rotor 10 by the gaseous working fluid L impossible.

So as to limit the variation of the diameter of the axis 11, at least one preloading element 60 (FIG. 3*c*, 3*d*) allows to artificially increase the natural diameter D1 of the axis 11 at a value close or equal to a loaded diameter D3, corresponding to a preloaded diameter D2. The preloading element 60 thus allows to permanently maintain the external diameter of the axis 11 at a preloaded value D2 even in absence of any external stress. In other words, the at least one preloading element 60 prevents the axis 11 to take its natural diameter D1 at rest. It is also to say that the variation of the diameter of the axis 11 is limited between its rest position and its working operation by means of at least one preloading element 60.

According to one aspect, the diameter of the axis 11 comprising at least one preloading element 60 varies less than 0.5%, preferably less than 0.2%, or less than around 0.05% when the rotational speed of the axis increases from rest conditions to high rotational speed conditions.

According to another aspect, the diameter of the axis 11 comprising at least one preloading element 60 varies non linearly when the rotational speed of the axis 11 increases from rest conditions to high rotational speed conditions. In particular, the diameter of the axis 11 remains, or substantially remains, at its preloaded value D2 from the rest conditions up to a predetermined high speed value and increases above such predetermined high speed value. Alternatively, the diameter of the axis 11 may continuously increase with the rotational speed increase at a rate lower than it would have been in absence of the preloading element or elements 60. The preloaded diameter D2 may thus correspond to the diameter that the axis 11 would naturally take under a functional high rotational speed.

The preloaded diameter D2 may be provided locally at specific locations of the axis 11, such as the terminal ends, or close to the terminal ends. Alternatively, the preloaded diameter D2 may be provided along the full length of the axis 11, resulting in a homogenous cylindrical preloaded axis. Alternatively, the preloaded diameter D2 may be provided along some portions of the axis 11.

A preloading element 60 according to the present disclosure may be any insertable element providing a mechanical force to the wall of the axis 11 oriented from its internal space 14 to outside, so as to urge the wall of the axis 11 to mechanically extend. A preloading element 60 may take the form of a ring, the diameter D2' of which is larger than the internal diameter of the axis 11 (FIGS. 3*c*, 3*d*). Alternatively, the preloading element 60 may be a cylinder, which is inserted within the internal space 14 of the axis 11 and having a diameter D2' larger than the internal diameter of the axis 11. The preloading element 60 may have a conical external shape or a truncated shape, or equivalent, facilitating its insertion within the axis 11. A given preloading element 60 may comprise some reinforcing elements 61 allowing to keep it light will preserving it strength. The preloading element 60 may be hollow or not. Any other arrangements may be used provided that the preloading element 60 provides a mechanical interference with the axis 11. A preloaded element 60 should be very well balanced so as to avoid or limit any vibration or failure under working operation. Considering the high rotational speed, the shape of the preloading element 60 preferably excludes any straight or acute angles so as to avoid mechanical weaknesses. In particular, the edges of the preloading element 60 are carefully rounded to lower or avoid stress concentrations at the boundaries of the preloading interface.

According to an aspect, the diameter D2' of the preloading element 60 is larger than the internal diameter of the axis 11 by around 0.05% to 0.1%, such as around 0.10% or 0.20%. According to another aspect, the diameter D2' of a preloading element 60 is larger than the internal diameter of the axis 11 by around 10 micrometres to around 90 micrometres, such as around 40 or 50 micrometres. One skilled in the art understands that the mechanical interference may me adequately designed according to specific needs.

The preloading element 60 is preferably selected to be lowly sensitive to the centrifugal forces under high speed so that its expansion under working operation remains limited. It is however noticeable that due to the mechanical interference between the preloading element 60 and the axis 11, the preloading element 60 is itself constraint and thus less sensitive to deformation conditions.

The preferred preloading elements 60 have a low thermal expansion. It may comprise or be made of ceramic material or other equivalent material having low thermal expansion coefficient. The preloading element 60 may have a thermal expansion coefficient smaller or equal than the one of the axis 11 so as to reduce the thermal expansion of the ensemble of axis and preloading elements 60 compared to the axis 11 alone, at least as long as the preloading element 60 remains in contact with the axis 11.

Also, regarding the mechanical expansion of the diameter under rotation speed, the preloading element 60 is preferably defined to remain in direct contact with the wall of the axis 11 under the full range of the high functional rotational speeds. This is at least suitable when the preloading element 60 has been forced within the axis while remaining without other fixation points than the direct contact with the wall of the axis 11. It is, however, possible that the preloading elements 60 are combined with a fixation element integral with the axis 11 so as to be maintained event in case the diameter of the axis 11 become larger than the preloading element 60. Such fixation element may be a central road within the axis, on which the preloading element may be fixed. Alternatively, the fixation element may be one or more recesses or protrusions of the wall within the axis 11.

According to a preferred arrangement, the preloading elements 60 may comprise or be made for example by silicon nitride, SiN or $Si_3N_4$, or an equivalent material. In another arrangement the preloading element may be made of the same material as the axis such that the thermal expansion difference is eliminated.

As an example, a rotor of the present disclosure having a natural diameter of 30 mm and an internal diameter of 25 mm, being made out of tungsten-carbide, has a natural diameter increase of 25 micrometres at 140 000 rounds per minute. A clearance of 11 micrometres is needed to support the rotor 10 in a stable manner. Including a preloading element 60 made of silicon nitride and providing a mechanical interference of around 50 micrometres allows to limit the diameter increase of the axis 11 to around 3 micrometres.

The gaseous working fluid L may be in theory any gaseous fluid and in particular refrigerant gases used in the industrial chillers such as the hydrofluorocarbons (HFC), hydrochlorofluorocarbons (HCFC), $CO_2$, ammonia and the like, or combinations thereof, when possible. Ammonia offers the advantage of a large latent heat. Thus, less mass flow is required to provide the same cooling capacity compared to classical refrigeration fluids. Decreased mass flows and high speed of sound tend to drive the ideal rotor speeds towards high values in order to maximize the efficiency for a given duty. The rotor and turbocompressor described here is particularly adapted for using Ammonia as gaseous working fluid L.

According to an aspect of the present disclosure, two radial compressor stages are provided to achieve the global pressure ratio of 6.5. This arrangement allows to not exceed the mechanically limiting impeller tip speed, which may be in the order of 500 $ms^{-1}$ to 600 $ms^{-1}$. For a 250 kW cooling capacity chiller an ideal rotor speed of 130 krpm can be provided for each stage, with impeller tip diameters around 50 mm. Due to rotodynamic constraints, the two compressor stages are preferably not mounted on the same rotor, hence the chiller will have to be driven by two individually driven compressors. This additional cost offers more flexibility and improved off-design performance. The compressor according to the present disclosure may of course comprise only one or more than two stages. Since each rotor can be driven individually, all the rotors may be either identical or different.

The present disclosure also covers a method of manufacturing a rotor 10 combined with one or several preloading elements 60. In particular, a preloading element 60 may be forced within the internal space 14 of the axis 11 by applying a high mechanical pressure and urge the preloading element 60 to fit within the axis 11. Such a press fitting process may be performed at room temperature such as around 20° C. Alternatively, a preloading element 60 may be press fitted at a higher temperature such as more than around 100° C. or more than around 200° C. or higher, so as to thermally provide an increase of the diameter of the axis 11. Alternatively, a liquid pressure may be provided in the internal space 14 of the axis 11 so as to mechanically increase its diameter and a preloading element 60 may be inserted within the internal space 14, either under press or under ambient pressure conditions. The external geometry of a preloading element 60 may be adapted to facilitate its insertion within the axis 11. To this end, a conical or truncated shape may be provided. According to an aspect of the present disclosure, the method comprises a step of preloading the axis 11, either using thermal conditions or mechanical conditions so as to increase its natural diameter D1. The method further comprises a step of inserting within the internal space 14 one or more preloading elements 60, with or without pressure. Preferably, the insertion step is performed while the preload conditions are applied to the axis 11. A step of releasing the preload after the one ore more preloading element 60 have been inserted is also part of the method. After this step, the diameter of the axis 11 is maintained at its preloaded value D2 by the means of the inserted preloading elements 60.

The present disclosure also covers a method for refrigeration operations such as cooling or freezing industrial rooms, using a high rotational speed rotor such as the presently described rotor.

The present disclosure also covers a method managing and controlling the stability of the rotor under rotational speeds higher than 170 000 rounds per minutes. As a matter of fact, the reduction of the clearance distortion due to centrifugal and thermal loads is significantly reduced by the presented idea, which makes the machine much more robust. The minimal clearance distortion also leads to a more stable gas bearing supported rotors, which are prone to rotodynamic instabilities.

In the present disclosure, the term "load" has the same meaning as "stress" and denotes any external constraint resulting in an increase of the diameter of the axis of the rotor 10. Such constraint includes the centrifugal forces, the temperature increase and a combination of both.

In the present disclosure, the expression "working operation" denotes at least the rotational movement of the rotor 10, preferably at its working speed or functional speed, which is the speed at which it provides the requested compression power. It also involves the flows of the gaseous working fluid L around the axis 11 so as to maintain it centred during its rotation.

In the present description, the expression "preloading element" can be used at singular or plural. It is understood that the present turbocompressor can comprise either one or more than one of such preloading elements, like 2, 3 4 or more than 4. It is also understood that in case several preloading elements 60 are present in the turbocompressor, they may be all identical, or on the contrary be different from one another. The differences between two preloading elements may relate to their shape, including their dimensions, and mechanical interferences with the axis 11, their composition or characteristics defined by either the corresponding Young's modulus, or density, yield stress, thermal expansion.

REFERENCE SYMBOLS IN THE FIGURES

1 Turbocompressor
10 Rotor
11 Axis
12 Protrusion
13 Surface area
14 Internal space
20 Bearing
30 Compressor impeller
31 Compressing blades
40 Housing
50 Inlet
60 Preloading element
A Longitudinal axis
D1 Natural diameter
D2 Preloaded diameter
L Gaseous working fluid

The invention claimed is:

1. A high speed rotor comprising:

a hollow axis having a natural diameter and a preloaded diameter greater than the natural diameter of the hollow axis;

an impeller; and at least one ring or cylinder configured to maintain the preloaded diameter of the hollow axis in an absence of external constraints.

2. The high speed rotor according to claim 1, wherein the preloaded diameter corresponds to the diameter said hollow axis naturally takes under a high rotational speed around its longitudinal axis or under high temperatures.

3. The high speed rotor according to claim 2, wherein said high rotational speed has a DN factor equal or higher than 3 million.

4. The high speed rotor according to claim 1, wherein said hollow axis defines an internal space, and wherein said at least one ring or cylinder is inserted within said internal space.

5. The high speed rotor according to claim 4, wherein the at least one ring or cylinder has a diameter greater than the natural internal diameter of the hollow axis.

6. The high speed rotor according to claim 4, wherein said at least one ring or cylinder is maintained in the hollow axis exclusively by its direct contact with the wall of the axis.

7. The high speed rotor according to claim 1, wherein one or more of the hollow axis and the at least one ring or cylinder has a specific modulus comprised between 0.01 to 0.5 GPa/kg/$m^3$ and a specific strength comprised between 0.01 to 0.9 MPa/kg/$m^3$, wherein the specific modulus denotes the ratio between the Young's modulus and the material density, and wherein the specific strength denotes the ratio between yield strength and the material density.

8. The high speed rotor according to claim 1, wherein the diameter varies less than 0.5% when the rotational speed of the hollow axis increases from rest conditions to functional high rotational speed conditions.

9. The high speed rotor according to claim 1, wherein the edges of the at least one ring or cylinder are rounded.

10. A device comprising:

at least one high speed rotor as defined in claim 1, said at least one high speed rotor being integrated within a housing comprising an inlet such that the impeller faces the inlet, and at least one high speed rotor being positioned on bearings so that the at least one high speed rotor is free to rotate without contact with said bearings under a flow of gaseous working fluid.

11. The device according to claim 10, wherein the clearance between the axis of said at least one rotor and the surrounding bearings is less than 30 micrometers.

12. The device according to claim 10, wherein the device is selected between a turbocompressor and a turbine.

13. The high speed rotor according to claim 1, wherein the high speed rotor has a thermal expansion coefficient lower than, or equal to, an expansion coefficient of said high speed rotor.

14. The high speed rotor according to claim 1, wherein said preloading element comprises one of silicon nitride, SiN or $Si_3N_4$.

15. A process for combining a rotor and at least one ring or cylinder, said rotor having a hollow axis having an external natural diameter and said at least one ring or cylinder having a diameter larger than said natural diameter, the process comprising:

inserting said at least one ring or cylinder in an internal space defined by the hollow axis under preloading conditions, wherein the hollow axis has a preloaded diameter greater than the natural diameter thereof.

16. The process according to claim 15, wherein the preloading conditions include or define either thermal conditions or fluid pressure conditions allowing to temporarily increase the natural diameter of the hollow axis.

17. The process according to claim 15, wherein the preloading conditions include or define a mechanical pressure applied on the preloading element to press fit the preloading element in the internal space of the hollow axis.

* * * * *